United States Patent [19]
Ragland et al.

[11] Patent Number: 5,406,930
[45] Date of Patent: Apr. 18, 1995

[54] OUTDOOR COOKING DEVICE

[75] Inventors: G. William Ragland; Christopher V. Ragland, both of Dunwoody, Ga.; Ralph E. Parker, Overland, Mo.

[73] Assignee: ATD Corporation, St. Louis, Mo.

[21] Appl. No.: 103,770

[22] Filed: Aug. 10, 1993

[51] Int. Cl.⁶ .................................................. F24B 3/00
[52] U.S. Cl. ............................. 126/25 R; 126/41 R; 220/215
[58] Field of Search ............... 126/25 R, 41 R; 220/215

[56] References Cited

U.S. PATENT DOCUMENTS

| | | |
|---|---|---|
| 1,815,570 | 7/1931 | Jones . |
| 1,910,703 | 5/1933 | LeGrand . |
| 1,934,174 | 11/1933 | Dyckerhoff . |
| 1,974,665 | 9/1934 | Schnetzer et al. . |
| 1,987,798 | 1/1935 | Ruppricht . |
| 2,010,180 | 8/1935 | DeFerranti . |
| 2,110,660 | 3/1938 | Doczekal . |
| 2,170,937 | 8/1939 | Bruning . |
| 2,180,373 | 11/1939 | Sibley et al. . |
| 2,212,481 | 8/1940 | Sendzimir . |
| 2,312,987 | 3/1943 | Grassick . |
| 2,441,476 | 5/1948 | Ewald . |
| 2,481,046 | 9/1949 | Scurlock . |
| 2,512,875 | 6/1950 | Reynolds . |
| 2,668,692 | 2/1954 | Hammell . |
| 2,783,358 | 2/1957 | Wolf . |
| 2,926,761 | 3/1960 | Herbert, Jr. . |
| 2,962,811 | 12/1960 | Herbert, Jr. . |
| 2,963,128 | 12/1960 | Rapp . |
| 2,967,225 | 1/1961 | Carrier, Jr. et al. . |
| 3,029,910 | 4/1962 | Kirk et al. . |
| 3,175,958 | 3/1965 | Bourgade . |
| 3,190,412 | 6/1965 | Rutter et al. . |
| 3,244,224 | 4/1966 | Hnilicka, Jr. . |
| 3,387,333 | 6/1968 | Irvine et al. . |
| 3,424,145 | 1/1969 | Stitt ................................... 126/25 R |
| 3,629,549 | 12/1971 | Svendsen . |
| 3,958,714 | 5/1976 | Barriere et al. . |
| 4,025,996 | 5/1977 | Saveker . |
| 4,037,751 | 7/1977 | Miller et al. . |
| 4,318,965 | 3/1982 | Blair . |
| 4,343,866 | 8/1982 | Oser . |
| 4,344,591 | 8/1982 | Jackson . |
| 4,386,128 | 5/1983 | Yoshikawa . |
| 4,425,497 | 1/1984 | Leary et al. . |
| 4,430,553 | 2/1984 | Antimovski . |
| 4,434,781 | 3/1984 | Koziol ............................. 126/25 R |
| 4,703,159 | 10/1987 | Blair . |
| 4,759,964 | 7/1988 | Fischer et al. . |
| 4,954,676 | 9/1990 | Rankin . |
| 5,011,743 | 4/1991 | Sheridan et al. . |
| 5,015,824 | 5/1991 | Monter et al. . |

FOREIGN PATENT DOCUMENTS

| | | |
|---|---|---|
| 2495875 | 6/1982 | France . |
| 2666717 | 3/1992 | France . |
| 126780 | 5/1919 | United Kingdom . |
| 471175 | 8/1937 | United Kingdom . |
| 783184 | 9/1957 | United Kingdom . |

*Primary Examiner*—Carroll B. Dority
*Attorney, Agent, or Firm*—Burns, Doane, Swecker & Mathis

[57] ABSTRACT

An outdoor cooking device which reduces heat transfer between the inner and outer surfaces of the device. The base includes a food cooking surface and a grate for supporting a heat source such as charcoal briquettes. The cover is supported on the base and encloses an open space facing the cooking surface. A multilayer heat insulating composite is provided on an inside surface of the cover and/or the base. The composite includes at least two layers of metal foil and at least one of the layers has a plurality of projections in point contact with an adjacent layer of the metal foil so as to provide a plurality of air spaces therebetween.

20 Claims, 7 Drawing Sheets

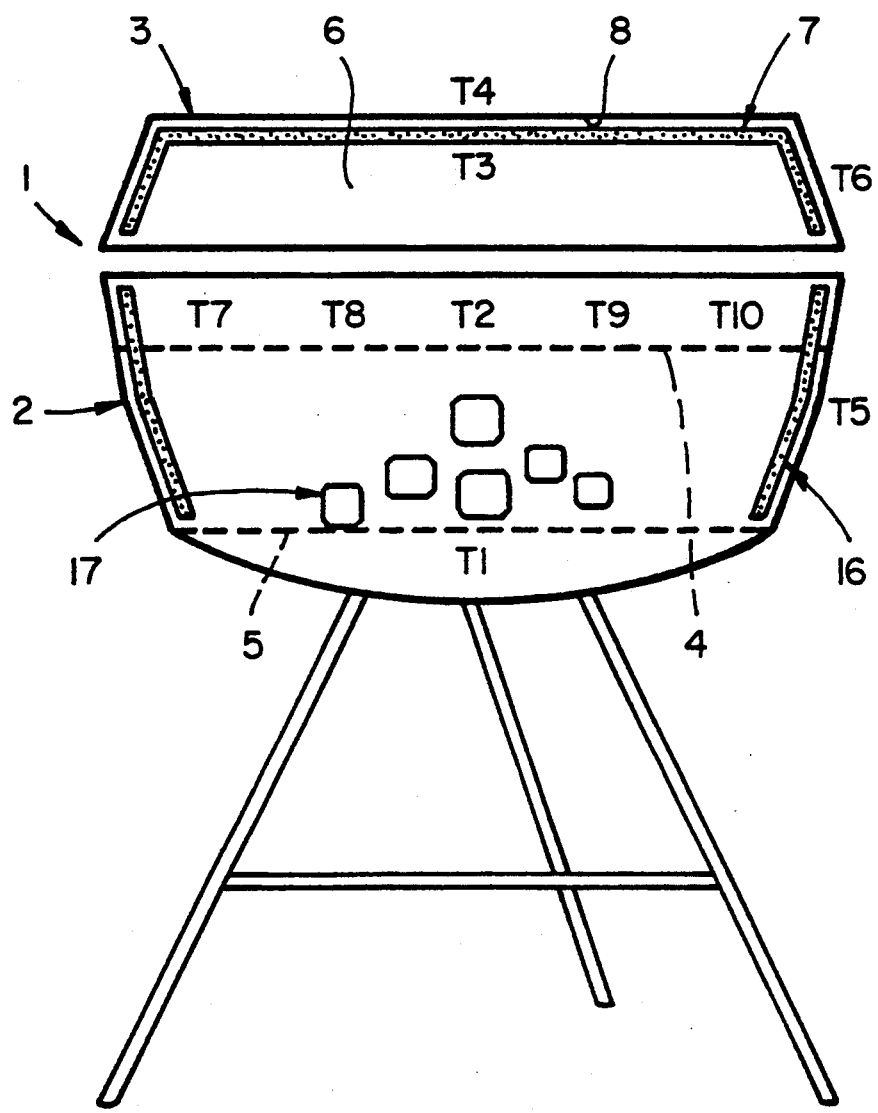
FIG_1
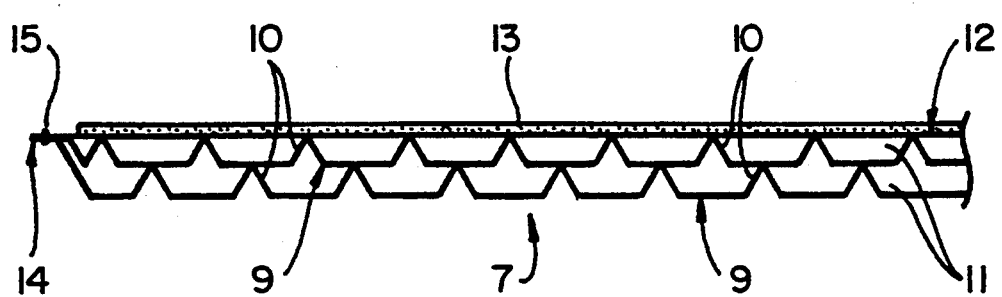
FIG_2

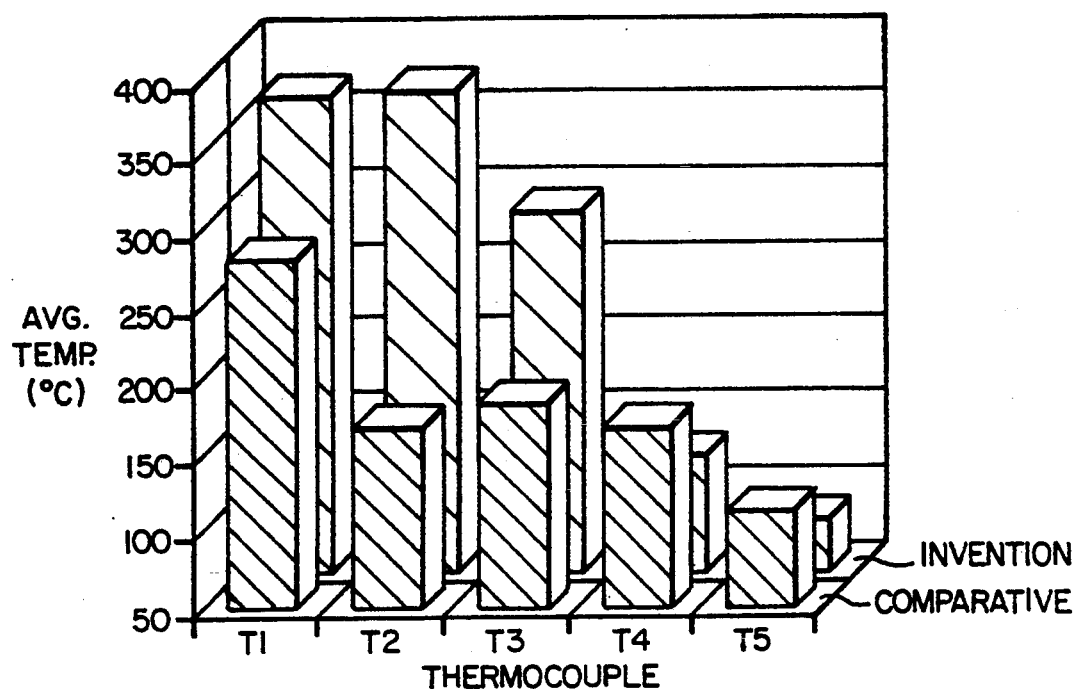
FIG_3
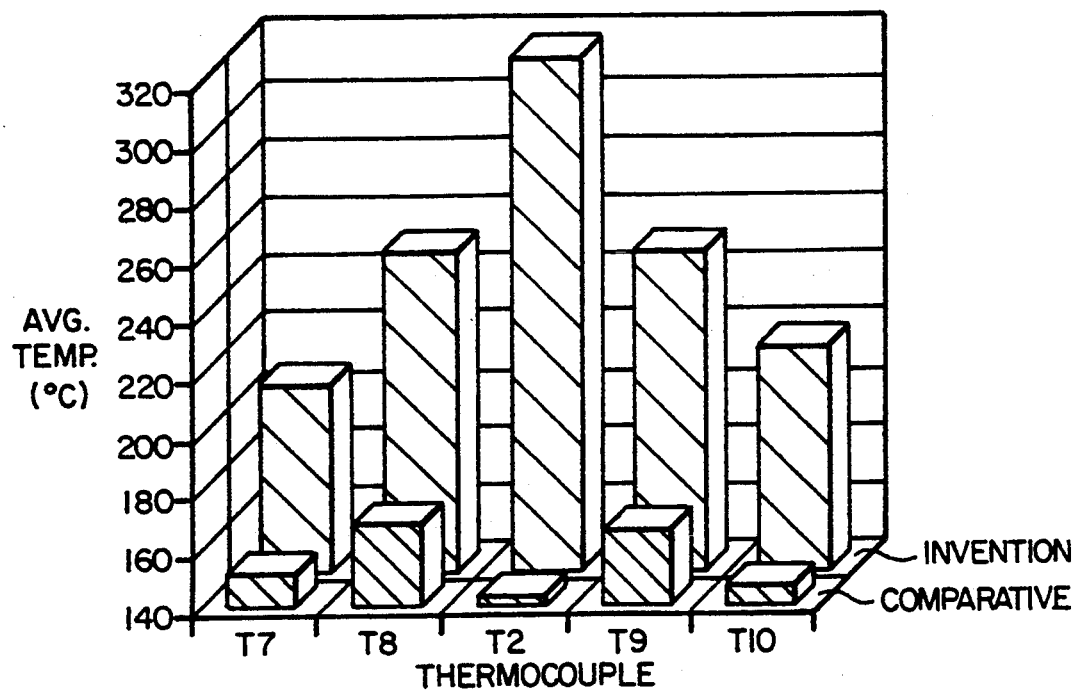
FIG_4

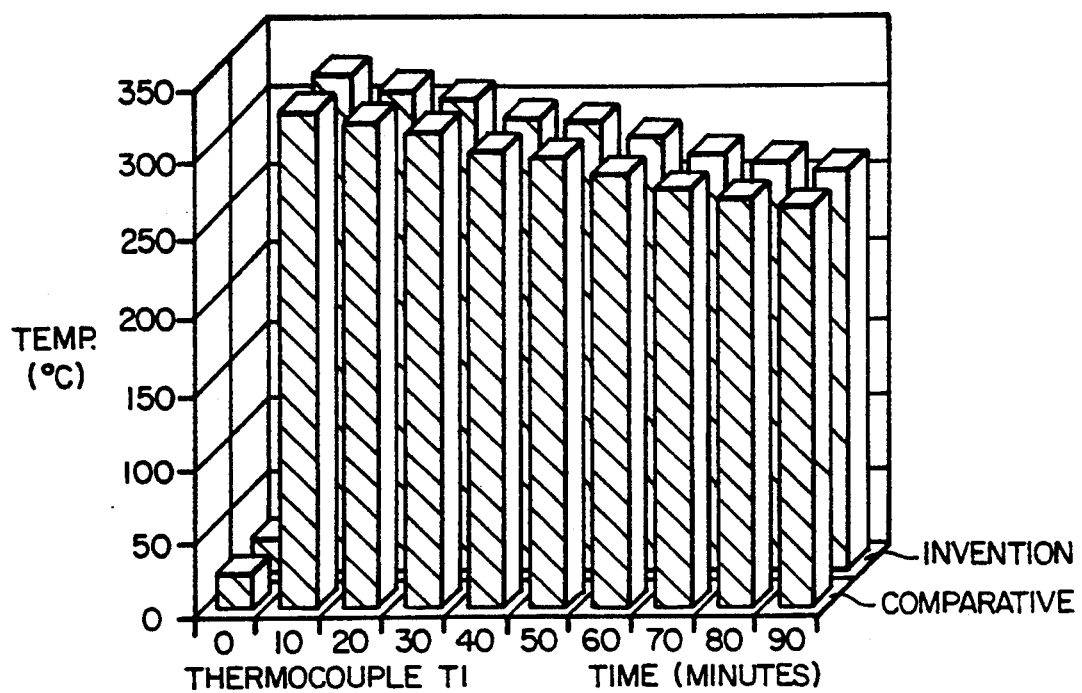
FIG_5
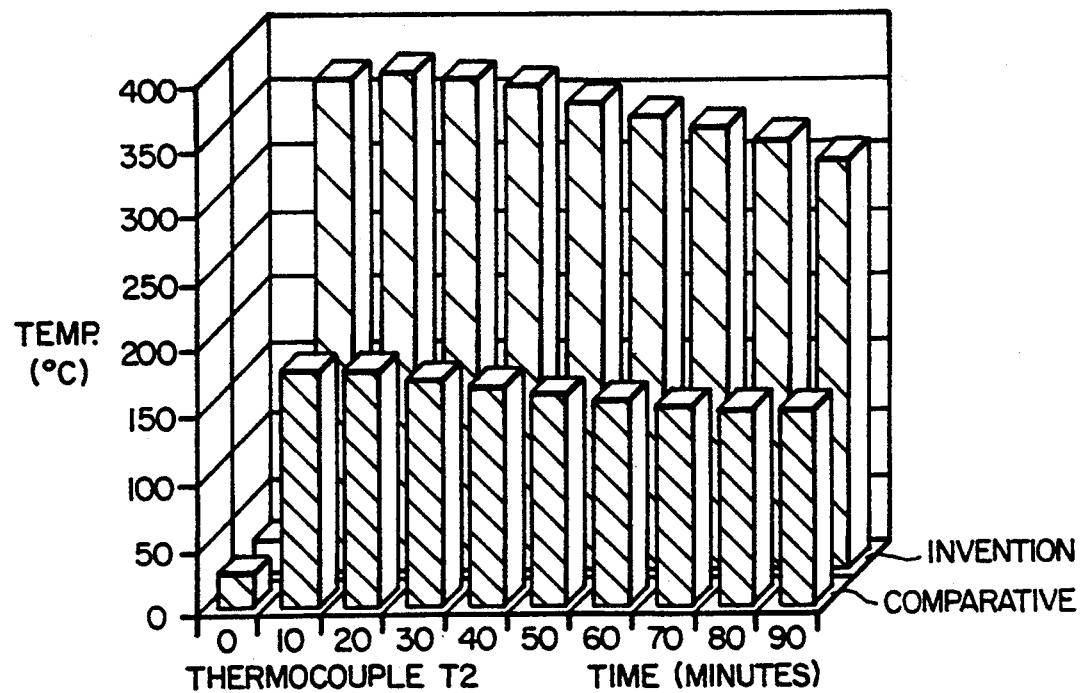
FIG_6

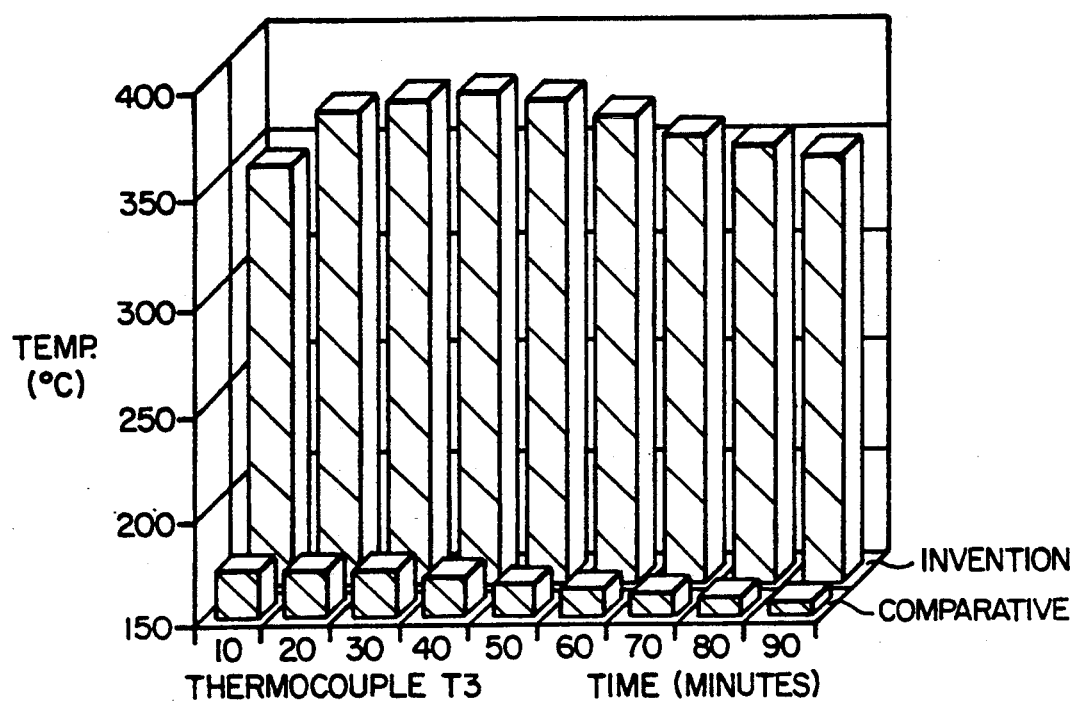
FIG_7
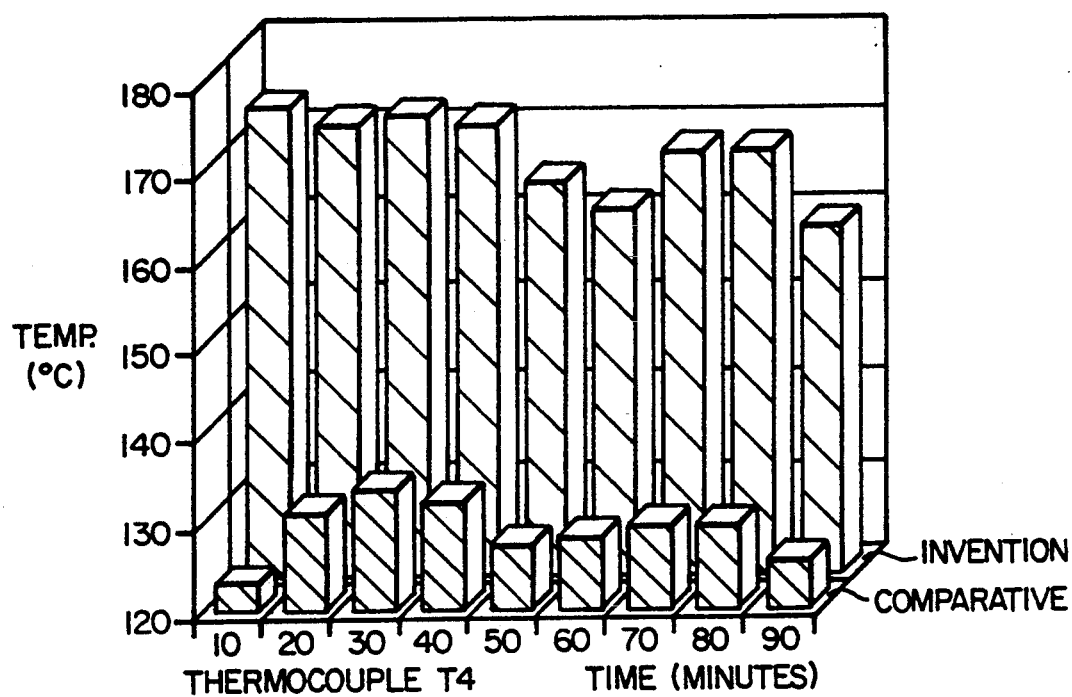
FIG_8

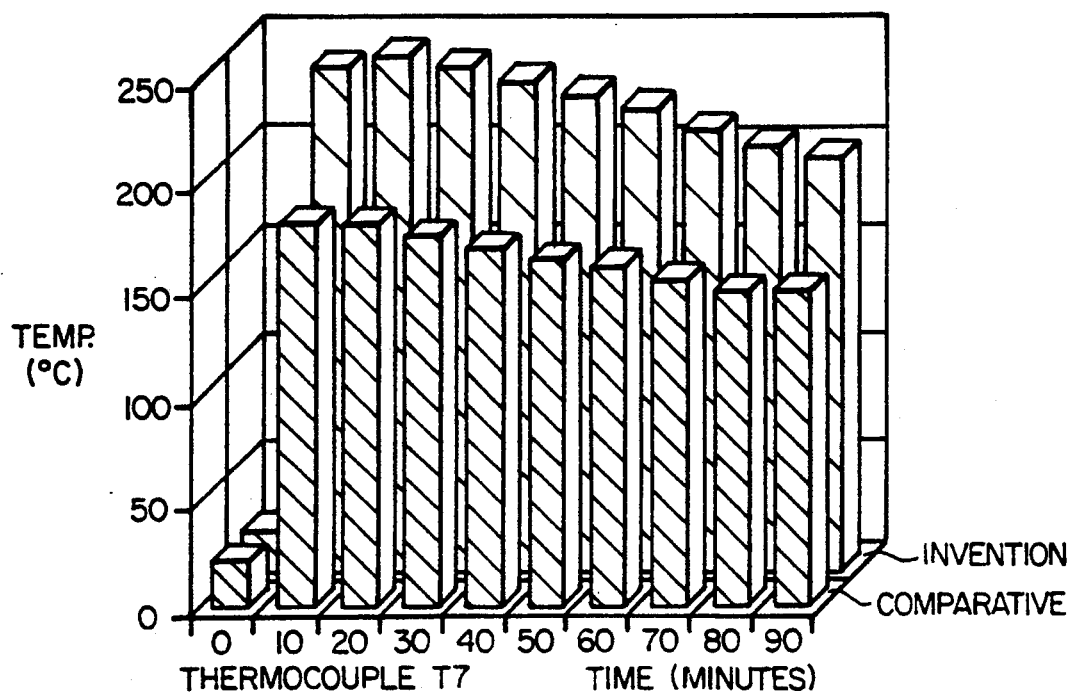
FIG_9
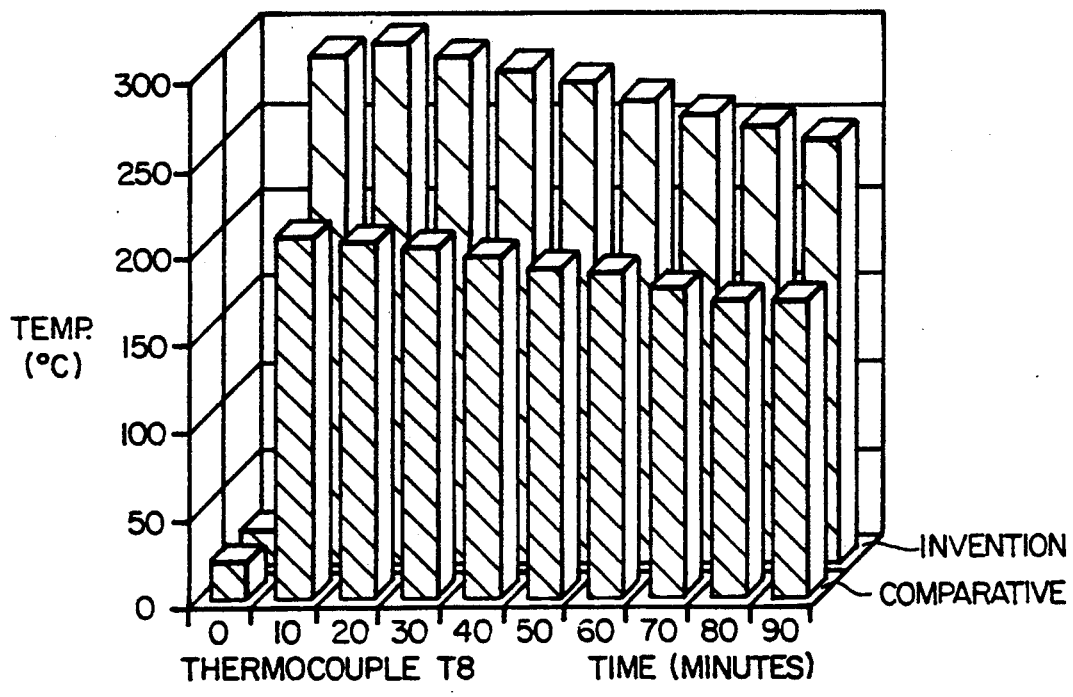
FIG_10

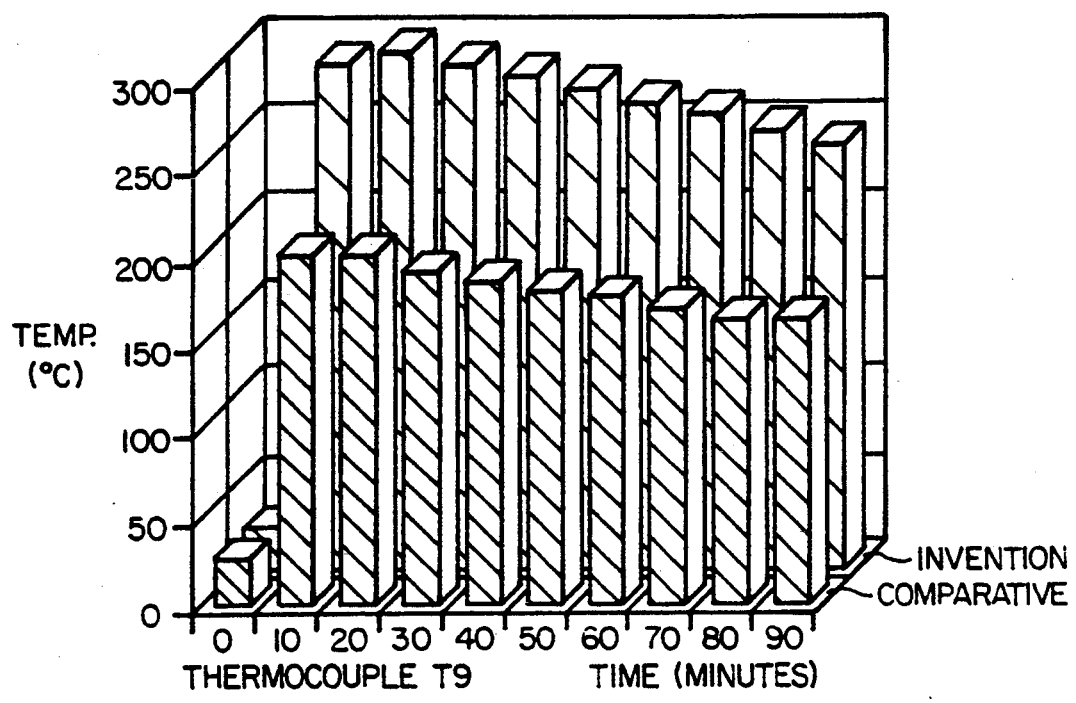
FIG_11
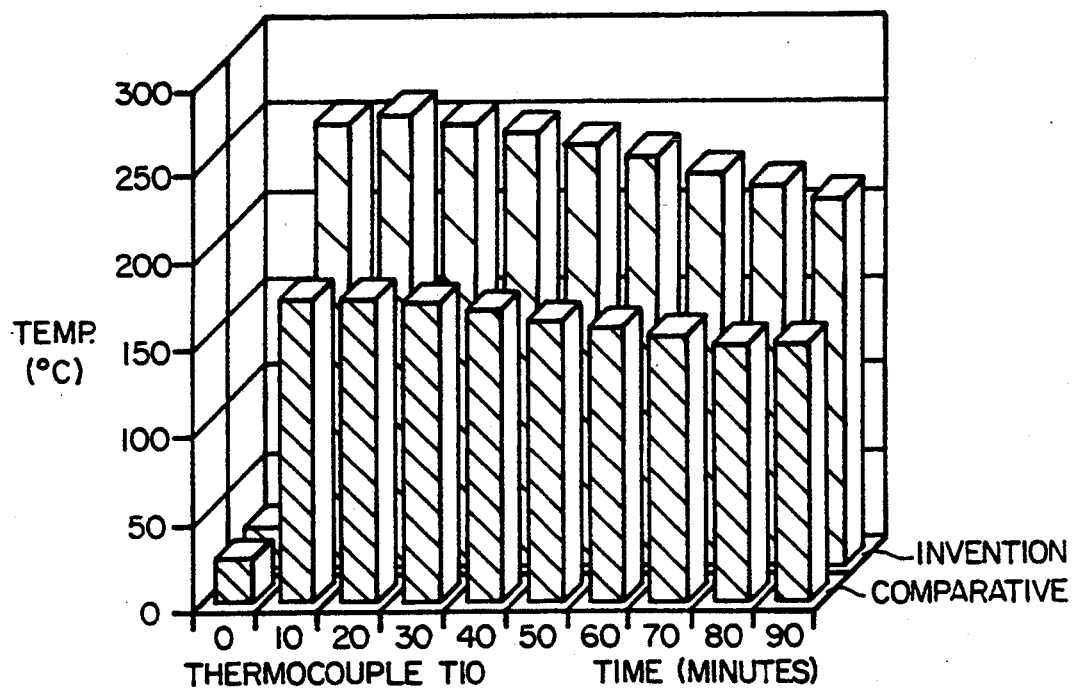
FIG_12

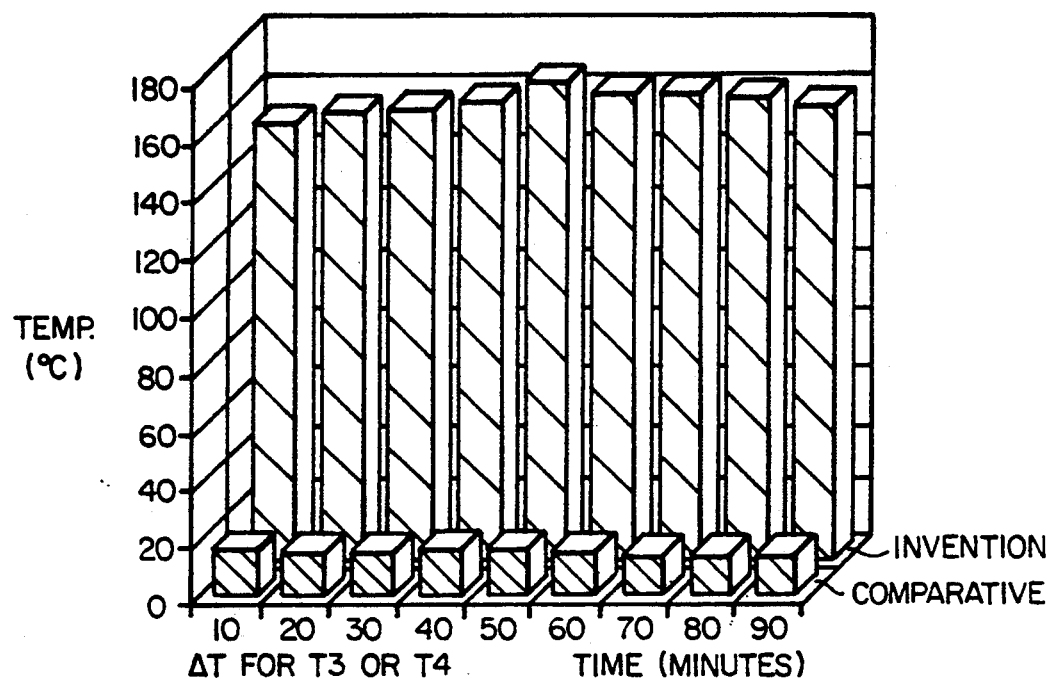
FIG_13
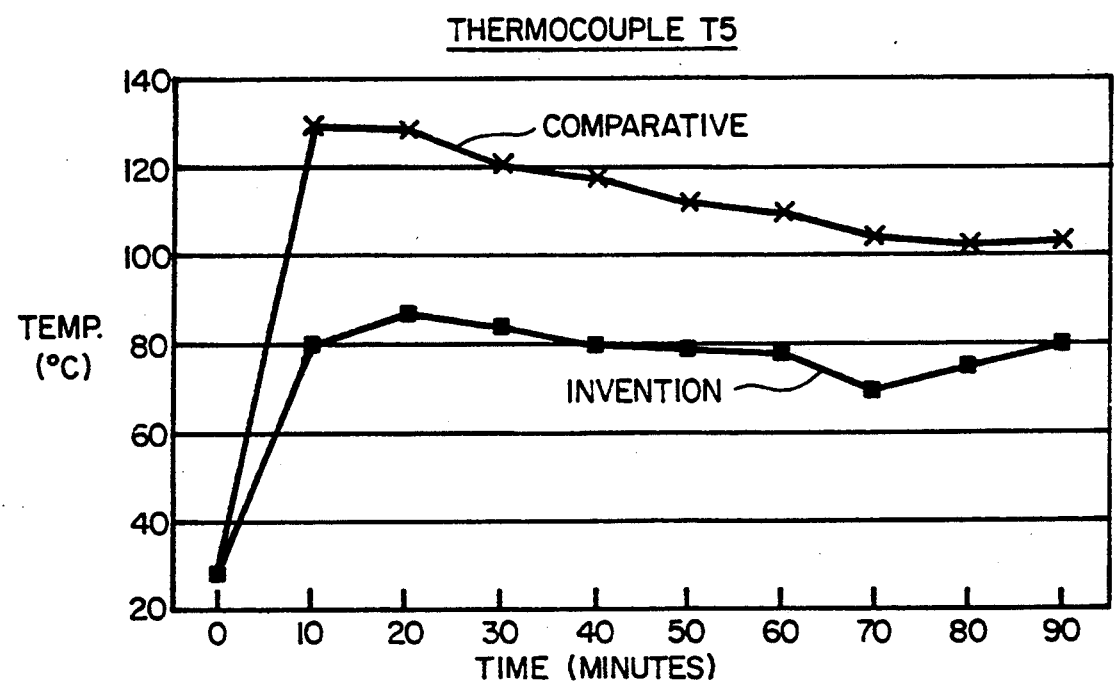
FIG_14

OUTDOOR COOKING DEVICE

BACKGROUND OF THE INVENTION

The present application is related to commonly-owned Ser. Nos. 07/897,080 filed Jun. 11, 1992 and now abandoned, and 08/063,577, filed May 19, 1993, both of which are hereby incorporated by reference. The present application is also related to commonly-owned U.S. Pat. No. 5,011,743, the subject matter of which is hereby incorporated by reference.

1. Field of the Invention

The present invention relates to outdoor cooking devices and more particularly, to outdoor cooking devices such as an outdoor barbeque oven.

2. Description of Related Art

A popular form of food preparation during warm weather is the outdoor barbeque. Typically, food is prepared by cooking it on a grill of an outdoor barbeque oven. Such barbeque ovens are usually heated with an ignitable fuel source such as charcoal, propane gas or a liquid fuel. Such cooking arrangements typically include a metal cover which fits over the cooking surface. In use, such covers become very hot which makes them difficult to handle and pose a burning hazard. In the case of charcoal grills, particularly large charcoal grills, it is especially difficult to obtain uniform heating across the grill surface unless a large amount of charcoal is used to cover the entire area under the grill. However, when a large amount of charcoal is used the grill can become too hot for cooking. As a result, it is necessary to wait until the fire dies down thus wasting energy and cooking time.

There is a need in the art for an outdoor cooking device which provides more uniform temperatures on the cooking surface, prevents the outer surface of the device from becoming too hot and provides more economical fuel consumption.

SUMMARY OF THE INVENTION

The invention provides an outdoor cooking device which includes a base, a cover and a multilayer heat insulating composite. The base includes a food cooking surface and means for supporting an ignitable heat source for heating the cooking surface. The cover is supported on the base and encloses an open space facing the cooking surface. The composite is on an inside surface of the cover and is effective for distributing heat more uniformly over the cooking surface and reducing transfer of heat to an outer surface of the cover. The composite includes at least two layers of metal foil and at least one of the layers has a plurality of projections thereon in point contact with an adjacent layer of the metal foil so as to provide a plurality of air spaces therebetween.

According to various features of the composite, the composite can include three layers of metal foil, four layers of metal foil or more than four layers of metal foil. At least one of the layers of metal foil preferably includes a pattern of embossments therein separating the layers to allow thermal convection in spaces therebetween and provide thermal conduction at spaced-apart points of contact between the embossments and an adjacent one of the layers. Although each of the layers of metal foil can include a pattern of embossments, it is preferred that one of the layers of the metal foil in contact with the inside surface of the cover is an outermost layer which is flat. The layers of metal foil can be of any suitable metal such as aluminum or an aluminum alloy. Preferably, the layers of metal foil are not metallurgically bonded together and the composite consists entirely of aluminum foil.

According to one aspect of the invention, the composite substantially covers all of the inside surface of the cover. For instance, the composite can include a plurality of discrete sections with one of the sections being located on a center of the inside surface of the cover and another one of the sections being located adjacent a lower edge of the inside surface of the cover. The composite can include a flat metal foil attached to the inside surface of the cover by any suitable means such as pressure sensitive adhesive or the composite can be attached by a mechanical connection such as bolts, screws, etc. A second multilayered heat insulating composite can be provided on the inner surface of the base and the second composite can be attached to the inner surface of the base in the same manner that the first composite is attached to the cover. The base can include a charcoal supporting grate located above a bottom wall of the base and the second composite can extend complete around the inner surface of the base and extend between the charcoal supporting grate and an upper edge of the base.

The base and cover can each be of a single layer of metal such as a porcelain coated sheet of steel. The cover can include one or more openings therethrough for venting of the cooking device in which case the composite includes holes therethrough in fluid communication with the openings in the cover. The ignitable heat source can comprise charcoal briquettes which can be supported on a suitable grate in the base or the ignitable heat source can comprise another type of fuel such as propane gas distributed beneath the cooking surface by a suitable gas distributing burner arrangement.

BRIEF DESCRIPTION OF THE DRAWINGS

FIG. 1 shows an outdoor cooking device in accordance with the invention;

FIG. 2 shows a multilayer heat insulating composite in accordance with the invention;

FIG. 3 shows a comparison of average temperatures measured by thermocouples 1–5 in FIG. 1 in a cooking device in accordance with the invention compared to a cooking device without the multilayer heat insulating composite according to the invention;

FIG. 4 shows a comparison of average temperatures across the cooking surface measured by thermocouples 7, 8, 2, 9 and 10 in FIG. 1 in a cooking device in accordance with the invention compared to a cooking device without the multilayer heat insulating composite according to the invention;

FIG. 5 shows a comparison of temperatures measured by thermocouple 1 in FIG. 1 in a cooking device in accordance with the invention compared to a cooking device without the multilayer heat insulating composite according to the invention;

FIG. 6 shows a comparison of temperatures measured by thermocouple 2 in FIG. 1 in a cooking device in accordance with the invention compared to a cooking device without the multilayer heat insulating composite according to the invention;

FIG. 7 shows a comparison of temperatures measured by thermocouple 3 in FIG. 1 in a cooking device in accordance with the invention compared to a cook- FIG. 8 shows a comparison of temperatures measured by thermocouple 4 in FIG. 1 in a cooking device in accordance with the invention compared to a cooking device without the multilayer heat insulating composite according to the invention;

FIG. 9 shows a comparison of temperatures measured by thermocouple 7 in FIG. 1 in a cooking device in accordance with the invention compared to a cooking device without the multilayer heat insulating composite according to the invention;

FIG. 10 shows a comparison of temperatures measured by thermocouple 8 in FIG. 1 in a cooking device in accordance with the invention compared to a cooking device without the multilayer heat insulating composite according to the invention;

FIG. 11 shows a comparison of temperatures measured by thermocouple 9 in FIG. 1 in a cooking device in accordance with the invention compared to a cooking device without the multilayer heat insulating composite according to the invention;

FIG. 12 shows a comparison of temperatures measured by thermocouple 10 in FIG. 1 in a cooking device in accordance with the invention compared to a cooking device without the multilayer heat insulating composite according to the invention;

FIG. 13 shows a comparison of differences in temperatures measured by thermocouples 3 and 4 in FIG. 1 in a cooking device in accordance with the invention compared to a cooking device without the multilayer heat insulating composite according to the invention; and FIG. 14 shows a comparison of temperatures measured by thermocouple 5 in FIG. 1 in a cooking device in accordance with the invention compared to a cooking device without the multilayer heat insulating composite according to the invention.

DETAILED DESCRIPTION OF THE INVENTION

The invention provides an outdoor cooking device which includes a base, a cover and a multilayer heat insulating composite. The base includes a food cooking surface and a means for supporting an ignitable heat source for heating the cooking surface. The cover is supported on the base and encloses an open space facing the cooking surface. The multilayer heat insulating composite includes a plurality of layers of metal foil for distributing heat more uniformly over the cooking surface and reducing transfer of heat to an outer surface of the cover.

FIG. 1 shows an outdoor cooking device 1 in accordance with the invention. The device 1 includes a base 2 and cover 3. The base 2 includes a food cooking surface 4 such as a wire grill and means 5 such as a grate for supporting an ignitable heat source for heating the cooking surface 4. The cover 3 can be pivotally supported on the base 2 and/or removable therefrom and the cover 3 includes an open space 6 facing the cooking surface 4. A multilayer heat insulating composite 7 is provided on an inside surface 8 of the cover 3. As shown in FIG. 2, the composite 7 includes at least two layers 9 of metal foil and at least one of the layers has a plurality of projections 10 thereon in point contact with an adjacent layer of the metal foil so as to provide a plurality of air spaces 11 therebetween. One of the layers 12 can be flat and a layer of adhesive 13 such as pressure sensitive adhesive can be provided on the flat layer 12 to facilitate attachment of the composite 7 to the inside surface 8 of the cover 3. An edge 14 of the composite 7 can be secured together by any suitable means such as staples 15. Alternatively, the edge 14 can be perforated to interengage the various layers of metal foil or one layer of foil can wrap around the edges of the remaining foil layers.

Each of the layers 9 of metal foil can be provided with a pattern of embossments. To avoid nesting of the embossments, one sheet can have a pattern of embossments oriented at 90° and the adjacent sheet can have a pattern of embossments oriented at 22°. That is, the embossments can have the same spacing and heights but by orienting the pattern of embossments in different directions it is possible to stack the layers of metal foil such that the embossments do not coincide and nest in each other. The size and spacing of the embossments can be adjusted depending on the thickness of the metal foil. Typically, the heights of the embossments will be smaller for thicker metal foils and higher for thinner metal foils. As an example, a two mail aluminum foil can be embossed with a spacing of 0.200 inch between embossments and with a 0.035 inch height of embossments.

The composite 7 can include as few as two layers of foil but preferably includes at least three layers or more. To facilitate attachment of the composite to the inside of the cover, the composite can include an outermost flat metal foil which has a layer of pressure sensitive adhesive thereon. Depending on the shape of the cover, it may be necessary to provide the composite 7 in more than one section with or without shaping means such as slits, perforations, cut-outs, etc. For instance, in the arrangement shown in FIG. 1, the composite 7 can include a flat center section attached to the center of the inside surface of the cover and one or more additional circumferentially extending sections can be provided adjacent the lower edge of the cover. The center section of the composite can be circular in shape and include a plurality of radially extending slits extending inwardly from the outer edge thereof to facilitate shaping the composite such that the outer edge bends downwardly along the sloped outer wall of the cover. The cover can include one or more vent openings and the composite 7 can include holes therethrough in fluid communication with the vent openings.

As shown in FIG. 1, the cooking device 1 can also include a second composite 16 located on the inner wall of the base 2. The second composite 16 is identical in construction to the composite 7. Thus, the second composite 16 surrounds charcoal briquettes 17 supported on the grate 5 and the second composite 16 extends between the grate 5 and an upper edge of the base 2. Also, the second composite 16 preferably extends completely around the inner surface of the base 2.

The composite according to the invention surprisingly and unexpectedly reduces the transfer of heat between the interior of the cooking device 2 to an outer surface thereof. In addition, the composite is effective in distributing heat more uniformly across the cooking surface 4. FIGS. 3-14 show results of tests carried out in a cooking device of the type shown in FIG. 1 with and without the composite 7, 16 according to the invention. The composite used in the insulated grill included four aluminum metal foil layers, three of which were embossed and one of which was a flat layer adhesively bonded to the inside surfaces of the cover and base. Each of the aluminum foils had a thickness of two mils. Thermocouples T1-T10 were located at the positions shown in FIG. 1. The tests were carried out by using two identical barbeque grills, one of which was insulated as shown in FIG. 1 and the other of which was uninsulated.

During the tests, charcoal briquettes were arranged in symmetrical layers of 16-9-4-1 in both grills and the charcoal briquettes were taken from the same container. The top and bottom vents of both grills were fully opened to ensure optimum draft. The thermocouple leads were connected to the corresponding terminals of a temperature measuring device. Equal amounts of lighter fluid were applied to both piles of charcoal and the charcoal was ignited after the charcoal was allowed to absorb the lighter fluid for two minutes. When the charcoal in both grills achieved a uniform white/gray appearance, the cooking grills and covers were placed on the base of each grill. Temperature readings were monitored every 10 minutes and the measurements are shown in FIGS. 3-14. Surprisingly and unexpectedly, the insulated grill provided a much higher temperature across the cooking grill surface than the uninsulated grill. Thus, the insulated grill according to the invention can utilize the heat from a given quantity of charcoal in a much more efficient manner than an uninsulated grill.

FIG. 3 shows an average of the temperatures measured by thermocouples T1-T5. In particular, the results for the insulated grill in accordance with the invention are shown behind the comparative results for an uninsulated grill.

FIG. 4 shows average temperatures of the cooking grill surface as measured by thermocouples T7, T8, T2, T9 and T10. In particular, the results for the insulated grill in accordance with the invention are shown behind the comparative results for an uninsulated grill.

FIG. 5 shows measured temperatures for thermocouple T1 at time intervals of 10 minutes. In particular, the results for an insulated grill in accordance with the invention are shown behind the comparative results for an uninsulated grill.

FIG. 6 shows measured temperatures for thermocouple T2 at time intervals of 10 minutes. In particular, the results for an insulated grill in accordance with the invention are shown behind the comparative results for an uninsulated grill.

FIG. 7 shows measured temperatures for thermocouple T3 at time intervals of 10 minutes. In particular, the results for an insulated grill in accordance with the invention are shown behind the comparative results for an uninsulated grill.

FIG. 8 shows measured temperatures for thermocouple T4 at time intervals of 10 minutes. In particular, the results for an insulated grill in accordance with the invention are shown behind the comparative results for an uninsulated grill.

FIG. 9 shows measured temperatures for thermocouple T7 at time intervals of 10 minutes. In particular, the results for an insulated grill in accordance with the invention are shown behind the comparative results for an uninsulated grill.

FIG. 10 shows measured temperatures for thermocouple T8 at time intervals of 10 minutes. In particular, the results for an insulated grill in accordance with the invention are shown behind the comparative results for an uninsulated grill.

FIG. 11 shows measured temperatures for thermocouple T9 at time intervals of 10 minutes. In particular, the results for an insulated grill in accordance with the invention are shown behind the comparative results for an uninsulated grill.

FIG. 12 shows measured temperatures for thermocouple T10 at time intervals of 10 minutes. In particular, the results for an insulated grill in accordance with the invention are shown behind the comparative results for an uninsulated grill.

FIG. 13 shows differences in temperatures measured by thermocouples T3 and T4. In particular, the differences in temperatures between thermocouples T3 and T4 for an insulated grill in accordance with the invention are shown behind the comparative results for an uninsulated grill.

FIG. 14 shows a comparison between temperatures measured by thermocouple T5. In particular, as shown in FIG. 14 the temperatures recorded outside the top of the base of a grill insulated in accordance with the invention are much lower than the measured temperatures for the same location in an uninsulated grill.

The foregoing has described the principles, preferred embodiments and modes of operation of the present invention. However, the invention should not be construed as being limited to the particular embodiments discussed. Thus, the above-described embodiments should be retarded as illustrative rather than restrictive, and it should be appreciated that variations may be made in those embodiments by workers skilled in the art without departing from the scope of the present invention as defined by the following claims.

What is claimed is:

1. An outdoor cooking device comprising:
a base including a food cooking surface and means for supporting an ignitable heat source for heating the cooking surface;
a cover supported on the base, the cover enclosing an open space facing the cooking surface; and
a multilayer heat insulating composite on an inside surface of the cover, the composite including at least two layers of metal foil and at least one of the layers having a plurality of projections thereon in point contact with an adjacent layer of the metal foil so as to provide a plurality of air spaces therebetween, the composite being effective for distributing heat more uniformly over the cooking surface and reducing transfer of heat to an outer surface of the cover.

2. The cooking device of claim 1, wherein the composite includes at least three layers of metal foil.

3. The cooking device of claim 1, wherein the composite includes at least four layers of metal foil.

4. The cooking device of claim 1, wherein at least one of the layers of metal foil includes a pattern of embossments therein separating the layers to allow thermal convection in spaces therebetween and provide thermal conduction at spaced-apart points of contact between the embossments and an adjacent one of the layers.

5. The cooking device of claim 1, wherein each of the layers of metal foil includes a pattern of embossments therein to allow thermal convection in spaces between the embossments and thermal conduction at points of contact between the embossments and an adjacent one of the layers.

6. The cooking device of claim 1, wherein one of the layers of the metal foil in contact with the inside surface of the cover is an outermost layer which is flat.

7. The cooking device of claim 1, wherein the layers of metal foil are of aluminum or an aluminum alloy.

8. The cooking device of claim 1, wherein the layers of metal foil are not metallurgically bonded together.

9. The cooking device of claim 1, wherein the composite substantially covers all of the inside surface of the cover.

10. The cooking device of claim 1, wherein the composite includes a plurality of discrete sections thereof, one of the sections being located on a center of the inside surface of the cover and another one of the sections being located adjacent a lower edge of the inside surface of the cover.

11. The cooking device of claim 1, wherein the composite includes a flat metal foil attached to the inside surface of the cover by means of adhesive.

12. The cooking device of claim 1, wherein the composite is attached to the inside surface of the cover by mechanical means.

13. The cooking device of claim 1, wherein the base includes an inner surface surrounding the cooking surface and a second multilayer heat insulating composite on the inner surface of the base, the second composite including at least two layers of metal foil and at least one of the layers having a plurality of projections thereon in point contact with an adjacent layer of the metal foil so as to provide a plurality of air spaces therebetween, the second composite being effective for reducing transfer of heat to an outer surface of the base.

14. The cooking device of claim 13, wherein the second composite includes a plurality of discrete sections thereof, one of the sections being located on a center of the inside surface of the cover and another one of the sections being located adjacent a lower edge of the inside surface of the cover.

15. The cooking device of claim 13, wherein the second composite includes a flat metal foil attached to the inside surface of the cover by means of adhesive.

16. The cooking device of claim 1, wherein the base includes a charcoal supporting grate located above a bottom wall of the base, the second composite extending completely around the inner surface of the base and being located between the charcoal supporting grate and an upper edge of the base.

17. The cooking device of claim 1, wherein the base and the cover are each of a single layer of metal.

18. The cooking device of claim 1, wherein the cover includes an opening therethrough for venting of the cooking device, the composite including a hole therethrough in fluid communication with the opening.

19. The cooking device of claim 1, wherein the ignitable heat source comprises charcoal briquettes.

20. The cooking device of claim 1, wherein the ignitable heat source comprises propane gas.

* * * * *